United States Patent
Chandrasekaran et al.

(10) Patent No.: US 7,711,916 B2
(45) Date of Patent: May 4, 2010

(54) STORING INFORMATION ON STORAGE DEVICES HAVING DIFFERENT PERFORMANCE CAPABILITIES WITH A STORAGE SYSTEM

(75) Inventors: Sashikanth Chandrasekaran, San Jose, CA (US); Angelo Pruscino, Los Altos, CA (US); James Williams, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 11/127,699

(22) Filed: May 11, 2005

(65) Prior Publication Data

US 2006/0259728 A1 Nov. 16, 2006

(51) Int. Cl.
G06F 12/00 (2006.01)
(52) U.S. Cl. .............................. 711/165; 711/114; 707/1
(58) Field of Classification Search .................. None
See application file for complete search history.

(56) References Cited

U.S. PATENT DOCUMENTS

| 5,361,349 | A | * | 11/1994 | Sugita et al. | 707/8 |
| 6,651,154 | B1 | * | 11/2003 | Burton et al. | 711/202 |
| 6,704,813 | B2 | * | 3/2004 | Smirnov et al. | 710/52 |
| 6,721,856 | B1 | * | 4/2004 | Arimilli et al. | 711/146 |
| 6,981,005 | B1 | * | 12/2005 | Cabrera et al. | 707/203 |
| 7,165,059 | B1 | * | 1/2007 | Shah et al. | 707/1 |
| 7,392,234 | B2 | * | 6/2008 | Shaath et al. | 707/1 |
| 2004/0193760 | A1 | * | 9/2004 | Matsunami et al. | 710/36 |

OTHER PUBLICATIONS

Duplessie, Steve, "A Blueprint for Tiered Storage," Apple Computer, TechTarget IT Briefing, 2004, located on the internet at <http://images.apple.com/xserve/raid/pdf/Tiered_Storage_Whitepaper.pdf>, 10 pages.

Everstore, "Hiarc HSM," Hiarc HSM Overview, 2002, located on the internet at <http://www.everstor.com/products/hiarchsm.html>, retrieved on Sep. 19, 2005, 1 page.

IBM., "IBM Tivoli Storage Manager for Space Management," IBM Product Overview, located on the internet at <http://www-306.ibm.com/software/tivoli/products/storage-mgr-space/>, retrieved on Sep. 19, 2005, 2 pages.

(Continued)

*Primary Examiner*—Kaushikkumar Patel
(74) *Attorney, Agent, or Firm*—Hickman Palermo Truong & Becker LLP

(57) ABSTRACT

Techniques are described for storing portions of files on different storage devices based on the devices' respective storage class. For example, different extents from a large file within a system, application, or database may be stored on different storage devices. The storage devices may be part of a single storage system that includes some storage devices that have different performance capabilities. The decision of where, within the storage classes, to store data may be based on the access patterns of the data. Access patterns regarding file extents are tracked using respective access bits, which are set when a memory block associated with an extent is accessed via an I/O operation. In one embodiment, an access bitmap is modified to account for cached blocks of file extents.

12 Claims, 4 Drawing Sheets

OTHER PUBLICATIONS

Kranz, Gary, "Strategic Storage: Smart Planning Moves Many to Tiers," SearchStorage.com, Dec. 8, 2004, located on the internet at <http://searchstorage.techtarget.com/originalContent/0,289142,sid5_gci1031276,00.html>, retrieved on Sep. 19, 2005, 4 pages.

Lebeck, Tad, "Tiered storage: does all data have to fly first class?—Storage Networking," Computer Technology Review, Feb. 2004, located on the internet at <http://www.findarticles.com/p/articles/mi_m0BRZ/is_2_24/ai_115310084/print>, Retrieved on Sep. 19, 2004, 3 pages.

Lugar, Julie, "Hierarchical storage management (HSM) solutions today," Service World Magazine, Oct. 2000, located on the internet at <http://www.serviceworldmagazine.com/webpapers/2000/10_camino.shtml?printme>, retrieved on Sep. 19, 2005, 3 pages.

McVoy, Larry, "LMbench—Tools for performance analysis—What is LMbench?" Overview, Jun. 26, 1998, located on the internet at <http://www.bitmover.com/lmbench/whatis_lmbench.html> retrieved on Sep. 19, 2005, 1 page.

Nuview, Inc., "Storage X- Creating Tiered Storage Architecture—A New Paradigm in Data Lifecycle Management," Whitepaper, 2005, retrieved from the internet at <http://www.nuview.com/registration/resources/whitepapers/TSA.pdf>, 13 pages.

Oracle, "Implementing ILM Using Oracle Database 10g," Oracle White Paper, Oct. 2004, 21 pages.

Red Hat, Inc., "Red Hat Linux 3—Reference Guide, Chapter 9-Network File System (NFS)," Red Hat Inc., 2003, located on the internet at <http://www.ms.washington.edu/Docs/Linux/rhel-rg-en-3/s1-nfs-client-config.html>, 4 pages.

Swingle, Bill et al., "FreeBSD Handbook, Chapter 24 Network Servers," The FreeBSD Documentation project, located on the internet at <http://www.freebsd.org/doc/en_US.ISO8859-1/books/handbook/network-nfs.html>, retrieved on Sep. 19, 2005, 8 pages.

SEARCHSTORAGE.COM, "Tiered Storage," Whatis.com Glossary, updated on Jan. 17, 2005, 1 page.

Veritas, "Veritas NetBackup Storage Migrator 5.1, Release Notes for UNIX," Veritas Software Corp. 1994-2004, pp. 1-8.

Wilkes, Richard et al., "The HP AutoRaid Hierarchical Storage System,", Hewlett-Packard laboratories, 1996 ACM Transactions on Computer Systems, vol. 14, No. 1, Feb. 1996, 29 pages.

* cited by examiner

STORING INFORMATION ON STORAGE DEVICES HAVING DIFFERENT PERFORMANCE CAPABILITIES WITH A STORAGE SYSTEM

FIELD OF THE INVENTION

The present invention relates generally to storage of data and other information and, more specifically, to techniques for storing data among storage devices within a storage system based on different performance capabilities of the devices.

BACKGROUND

An application that contains a large amount of data may have some fraction of that data that is heavily used and some fraction that is infrequently used. Furthermore, legal requirements, such as the Sarbanes-Oxley Act, have increased the need for applications to retain data long after it has been accessed. Thus, there is a need for managing storage of data with different access patterns in the most cost-effective manner.

There are numerous commercial solutions that currently address the need for managing storage of data with different access patterns. These solutions are commonly referred to as "Hierarchical Storage Management" ("HSM"). Recently, some vendors have started marketing their solutions by referring to them as "Information LifeCycle Management" ("ILM"). All the current solutions have drawbacks, as described hereafter.

Various approaches to HSM allow administrators to specify criteria for migrating infrequently used data to secondary or tertiary storage (e.g., tape) that have less performance capabilities than primary storage. In all these systems, the granularity of migration is an OS file. A forwarding pointer is left in a file system, allowing the HSM system to semi-transparently recall the data. It is semi-transparent because the user is likely to notice the delay and an administrator may need to load the secondary media. However, in the context of a database, for example, there may be relatively few large files and there may be some data within a file that is frequently accessed and some other data within the same file that is infrequently accessed.

Existing approaches to HSM also do not allow segregation of data within primary storage devices and, therefore, do not provide direct access to data stored on secondary or tertiary storage devices. That is, data on the secondary or tertiary storage devices must be accessed via the forwarding pointers, in the primary storage, to the data stored on the lesser performing storage devices. For example, data in secondary storage may be only accessible via an NFS (Network File System) mount from the primary storage. One example of this type of approach allows for use of compressed disks (i.e., secondary storage), whereby an administrator is able to specify that infrequently used data be moved from primary storage disks to the secondary compressed disks. However, the data stored on the compressed disks is only accessible via primary storage. Furthermore, some data on the compressed disks may even eventually be moved to tertiary storage, such as tape. Another approach transparently moves infrequently used data from RAID-1 mirroring to RAID-5 protection, i.e., different disk systems with different storage characteristics. However, neither of these approaches provide for data storage on storage devices with disparate performance capabilities that logically operate as a single primary storage system and that, therefore, provide for direct access to all the data.

One approach to application data management software allows users to relocate a set of business transactional data. The granularity of relocation is not an OS file or database object, but a collection of records. Like HSM, the application's administrator defines the retention policies of a business transaction. This approach does not manage a system of disks, within a primary storage system, with different performance capabilities (it does not interface at the database or storage layer but at the SQL application layer), but the user can specify a slower storage configuration as the target for the relocation of data. Determining the relocation and retention policies for business transactional data requires careful analysis and planning. Hence, this approach is currently used with a small set of applications and databases and is not a general HSM solution. Further with this approach, the data management software is schema-specific and must be particularly configured for a particular application.

As described in "Implementing ILM in Oracle Database 10 g," available from Oracle Corporation, the partitioning functionality that some databases provide to manually divide the database schema into partitions based on the value of certain data can be used to store the data on different storage devices based on the partitions. For example, a common partitioning column would be a date column and a database record will be stored in a particular partition based on the value of the date column. Another common partitioning column is a status column. A record whose status has been changed to, for example, "PROCESSED", will be moved to a different partition than, for example, an "ACTIVE" partition.

The drawbacks of the forgoing approach are that it is applicable only to data stored in a RDBMS, the RDBMS schema must have a natural partitioning criteria (such as a date column or a status column), the schema has to be manually partitioned, and the partitions must be manually created in different disks based on expected usage. Furthermore, this approach is not completely automatic because it is state-driven. That is, because the partitioning is performed based on specific values in a column (e.g., put records with year value "2005" in one partition and records with all other year values in a different partition), certain uncontrollable changes may require updating the application (e.g., when the calendar year changes). This is not a general solution and may not be applicable in many scenarios.

Another approach is referred to as "tiered storage," where data from a particular database or particular application is stored on storage devices in one class of storage devices, whereas data from a different database or application is stored on storage devices in a different class of storage device. For example, a database used daily for transactional data operations may be stored on relatively fast storage devices of one storage class, whereas a separate database of historical data, which is only accessed quarterly or annually, may be stored on relatively slow storage devices of another storage class. One drawback to this approach is that the storage system is effectively segregated on a per-database or per-application basis. Consequently, data within a particular database or a particular application cannot be stored on storage devices having different storage classes.

The foregoing description provides an overview of just some of the many approaches and solutions for managing the storage of data. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW OF EMBODIMENTS OF THE INVENTION

Techniques are described for storing portions of files on different storage devices based on the devices' respective storage class. For example, different extents from a large file within a system, application, or database may be stored on different storage devices (e.g., disks). The storage devices may be part of a single storage system that comprises classes of storage devices having different performance capabilities. The decision of where, within the storage classes, to store data may be based on the access patterns of the data. Thus, infrequently used data can be located, or relocated, to a set of slow storage devices while maintaining the frequently used data on faster storage devices. The data can be managed relatively transparently to the user while ensuring that the data is always online and available. Such techniques can be used, for example, when first creating data or a data structure, and for data migration and promotion purposes. This allows minimization of storage costs without sacrificing performance, because slower disks are usually cheaper.

In one embodiment, performance capabilities of the different storage devices are automatically determined and, based on the performance capabilities, respective storage classes are automatically assigned to the storage devices. Furthermore, in one embodiment, storage devices from a set of storage devices belonging to a common storage class are associated with a particular virtual directory so that the set can be generally referenced by referencing the particular directory.

Access patterns of file extents are tracked using respective access bits, which are set when a memory block associated with an extent is accessed via an I/O operation. Periodic reads of the access bits are taken and saved in a statistics repository, which can be referenced in data migration policies. In one embodiment, an access bit bitmap is modified to account for cached blocks of file extents. That is, the file extents with blocks that are cached (frequently accessed data blocks) are logically subtracted from the bitmap so that they do not appear to be infrequently accessed and, therefore, so that these extents are not automatically migrated. Otherwise, these file extents would appear to be infrequently accessed because their access bits are not set because they were not the subject of an I/O operation.

Operating Environment

Figure 1:
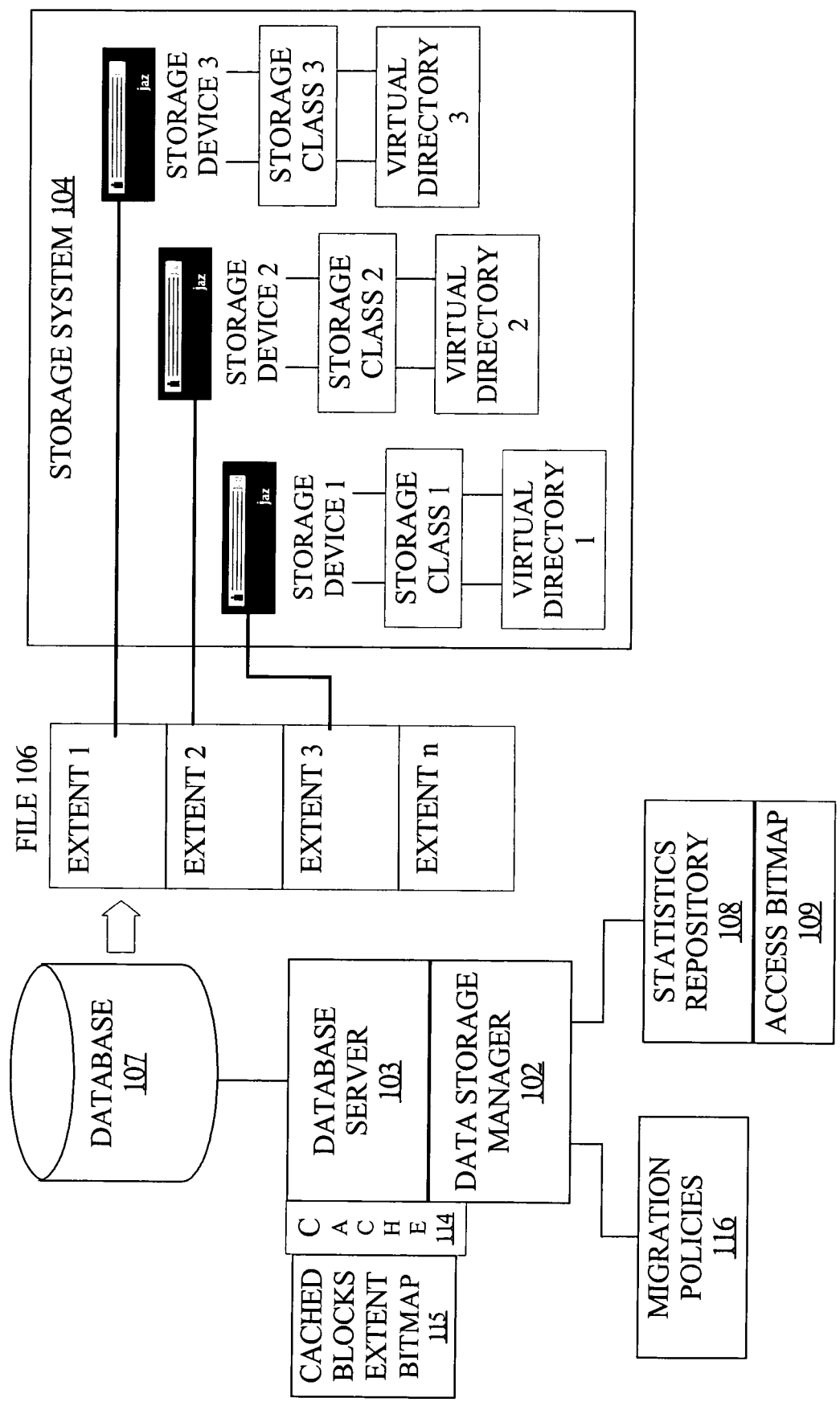
FIG. 1 is a block diagram illustrating an operating environment in which an embodiment of the invention may be implemented.

FIG. 1 is a block diagram illustrating an operating environment in which an embodiment of the invention may be implemented. Data storage techniques described herein generally may be implemented with a data storage manager 102 that facilitates managed storage of data, such as a large file 106, within a storage system 104. The operating environment illustrated in FIG. 1 is in the context of a database management system, for purposes of providing an example. However, embodiments of the invention are not limited to implementation in the context of a database management system, and may be applied to managed storage of data in other contexts, such as file systems and storage volume managers.

The techniques described herein may be implemented in any number of operating environments. However, more benefits are achieved by implementing such techniques in the context of a system that uses and maintains relatively large files. File 106 of FIG. 1 is depicted as comprising multiple extents, extent 1 through extent n, where n may be any number. An "extent", as used herein, refers to a set of multiple contiguous blocks of persistent memory in which at least a portion of a container of data, such as a file, is stored.

Data storage manager 102 manages the storage of data in storage system 104. More detailed functionality of data storage manager 102 is described throughout. Data storage manager 102 may be implemented as software, i.e., one or more sequences of instructions which, when executed by one or more processors, cause the processors to perform certain actions. Significantly, according to embodiments of the invention, data storage manager 102 is capable of managing the storing of different extents of a data file or other data container in different storage devices within a storage system, where the different storage devices are associated with different classes of storage based on the performance capabilities of the devices. For example, data storage manager 102 can store extent 1 of file 106 in storage device 3 of storage system 104 based on a storage class corresponding to storage device 3, i.e., storage class 3. Additionally, data storage manager 102 can store extent 2 of the same file 106 in storage device 2 of storage system 104 based on a different storage class corresponding storage device 2, i.e., storage class 2.

Storage System

Storage system 104 is a data storage system comprising multiple storage devices, illustrated in FIG. 1 as storage device 1, storage device 2, and storage device 3. The number of separate storage devices within storage system 104 may vary from implementation to implementation and, therefore, the three storage devices depicted in FIG. 1 is arbitrary and for facilitating a simple example. One example of a storage device is a disk storage system comprising one or more storage disks, such as but not limited to, magnetic, optical, and magneto-optical storage disks.

Each storage device within storage system 104 may have unique performance capabilities and characteristics relative to the other storage devices, or may have the same performance capabilities and characteristics as other storage devices. Thus, in one embodiment, each storage device of storage system 104 (e.g., storage device 1, storage device 2, storage device 3) is associated with a corresponding storage class (e.g., storage class 1, storage class 2, storage class 3). Each storage class is defined to relatively rank the performance capabilities and/or characteristics of storage devices that are associated with that storage class. Performance is generally measured in terms of I/O speed, which may include read latency, write latency, bandwidth, and the like. In one embodiment, the reliability of storage devices is also considered in the definition of storage classes. A given storage class can be associated with any number of storage devices.

The storage classes that characterize storage system 104 represent the relative ranking of the performance capabilities and characteristics of the constituent storage devices. For example, the fastest storage devices could be associated with storage class 1, the intermediate fast storage devices could be associated with storage class 2, and the slowest storage devices could be associated with storage class 3.

The entire storage system 104 is considered primary storage, in contrast with a storage system in which, for example, disks are used for primary storage and tape is used for secondary storage. For example, some storage systems use secondary storage to store less frequently accessed data or to store a backup copy of primarily stored data. However, with a two-tiered storage system, in which some storage is considered primary and some secondary, only the primary storage is kept online and accessible at all times whereas the secondary storage is likely to be offline and not as quickly and readily accessible. For example, using tape as secondary storage requires manual or robotic loading in order to access data on the tape).

Some data may be accessed only at infrequent intervals, e.g., at the end of a fiscal quarter or at the end of a fiscal year. If this data is moved to offline storage such as tape, there is no guarantee that the data is transparently accessible when the end-of-quarter or end-of-year processing is performed. That is, even assuming there are tape robots, the storage system is dependent on 3rd party media agents to bring the data online. By contrast, because the entire storage system 104 is primary storage, the context of the storage classes is solely within the logically single system of storage system 104. This is in contrast with known prior approaches, in which the storage class hierarchy spans primary and secondary storage and, therefore, spans storage systems.

In the example operating environment of FIG. 1, data storage manager 102 is depicted as operating in conjunction with, or in communication with, a database server 103 that manages data stored in a database 107. As mentioned, the database context is non-limiting and presented as an example in order to describe other aspects and embodiments of the invention. Database server 103 uses cache memory 114, from which a cached blocks extent bitmap 115 may be constructed as described hereafter.

Data storage manager 102 is communicatively coupled to a statistics repository 108 in which access information is stored, such as an access bitmap 109 for file 106. Furthermore, in one embodiment, data storage manager 102 has access to, and operates according to, migration policies 116. The uses of the statistics repository 108, access bitmap 109 and migration policies 116 are all described in more detail hereafter.

Creating Storage Classes for the Storage System

As mentioned, the storage devices within storage system 104 are categorized according to a storage class. Storage classes can be determined automatically, such as by data storage manager 102, or can be explicitly specified by an administrator. In one embodiment, a GUI interface can be used to map the storage classes to user-friendly strings (e.g. 1=high-performance, 2=low-cost, 3=historical, etc.). The common convention is that storage devices with lower storage class number are better storage devices. A storage device's storage class can be specified when adding a storage device to the storage system 104. The exact syntax used to specify the storage class is unimportant and may vary from implementation to implementation.

In one embodiment, the performance capabilities of the storage devices within storage system 104 are determined automatically based on the result of microbenchmarks that perform random read and write operations with the storage devices. An example of such a microbenchmark is "lmbench" which is currently described at http://www.bitmover.com/lmbench/ and which can be used to measure I/O performance. The layer at which such microbenchmarks are executed may vary from implementation to implementation. For example, relevant microbenchmarks may be executed at the OS layer or at the storage application layer (e.g., by data storage manager 102). In a related embodiment, the storage devices within storage system 104 are automatically assigned storage classes based on the automatically determined performance capabilities. Hence, configuration of the storage classes associated with storage system 104 can be implemented to be completely automated.

User Reference to Storage Classes

In one embodiment, an identifier is created for referencing a subset of storage devices within the storage system 104 that belong to the same storage class. Thus, the subset of storage devices can be specified in file creation and other commands. For example, a user may explicitly require that a file be created on a storage device with a specific storage class. To facilitate this, the data storage manager 102 creates virtual sub-directories based on storage class. These virtual sub-directories are children of the root of the file system associated with storage system 104, in which extents of file 106 are stored. FIG. 1 depicts virtual directory 1 associated with at least storage device 1, which is associated with storage class 1; virtual directory 2 associated with at least storage device 2, which is associated with storage class 2, and so on.

In the following example, a UNIX-like operating system is assumed. However, the embodiment is certainly not restricted to a UNIX-like operating system. Assume that the file system is created on top of a set of disks that are under the device directory "/dev/rdsk". Further, assume that there are a collection of disks, i.e., diska1, diska2, diska3, diskb1, diskb2 and diskb3, that are available as raw block devices under "/dev/rdsk". Hence, diska1 would be named "/dev/rdsk/diska1". Assume that diska1, diska2 and diska3 are fast disks and have a storage class value of 1; whereas diskb1, diskb2 and diskb3 are slower disks and have a storage class value of 2. Assume that the file system is mounted under the "/usr directory". Hence, the set of disks that have storage class 1 can be specified using the virtual sub-directory "/dev/rdsk/[1]" or "/usr/[1]". Similarly, the set of disks that have storage class 2 can be specified using the virtual sub-directory "/dev/rdsk/[2]" or "/usr/[2]". Therefore, if a user knows in advance that one or more files will be rarely used, then these files can be created under the directory "/usr/[2]", for example.

Administrator Interface to Storage Classes

An administrator can specify migration policies, such as migration policies 116. The migration policies tell the data storage manager 102 how data is to be transparently relocated to storage devices with a different storage class. Migrated data can be transparently recalled to its original storage class (if space is available) on first access. The administrator can specify a time specification in the migration policy. For the purpose of illustration, assume that the command to specify the migration policy is called "migrate". Further assume that "/dev/rdsk/[1]" and "/dev/rdsk/[2]" are two virtual sub-directories that are created to refer to the set of raw block devices that are of storage class 1 and storage class 2, respectively. For example, the administrator can specify, in the context of virtual sub-directories associated with the storage classes, that data which has not been accessed for one year must be migrated from storage class 1 to storage class 2 as follows:

$ migrate–from /dev/rdsk/[1]–to /dev/rdsk/[2]–days 365.

The foregoing command uses a syntax style that is common in UNIX, but the idea is not restricted to UNIX file systems or UNIX storage managers. Like other HSM products, the migration is a continuous process. Once the policy has been specified, the migration will be executed when there is data that meets the criterion. This can be readily implemented using a background task or process.

Of course, other migration policies are also possible. For example, the system may allow the administrator to configure free space thresholds that specify that data must be migrated out of a storage class if the free space in a storage class falls below a certain threshold. The free space within a disk is already tracked, for example, by data storage manager 102. Hence, this policy does not require new free space management metadata.

Storing File Extents in Different Storage Classes

As discussed, a file is divided into extents where each extent is a sequence of contiguous blocks. It is common for a file to start with a small extent size (e.g. 1 MB) and as more data is appended to the file, newer extents may have larger sizes (e.g. 16 MB). The techniques described herein are most beneficial when used for large files (e.g. 1 GB, 100 GB), although the techniques are not so limited. Large files are common in applications where the size of the data set is large (e.g. 1 TB) because it is easier to manage large data sets with a small number of large files than a large number of small files.

A file extent map, which indicates with which particular extents the file is associated, is typically stored as file metadata. For example, with a UNIX-based system, the extent map may be stored in a file's inode block. The extent map is simply a list of extent pointers, i.e., pointers to locations of the file's extents on persistent storage devices. An extent mapping is often cached in memory because of its use with each I/O operation.

The granularity of storage, e.g., migration or promotion, is a file extent. Thus, a file that contains migrated data may have some extents that are allocated in storage devices belonging to one storage class and have some other extents that are allocated in storage devices belonging to another storage class.

A Method for Storing Data on a Storage System

Figure 2:
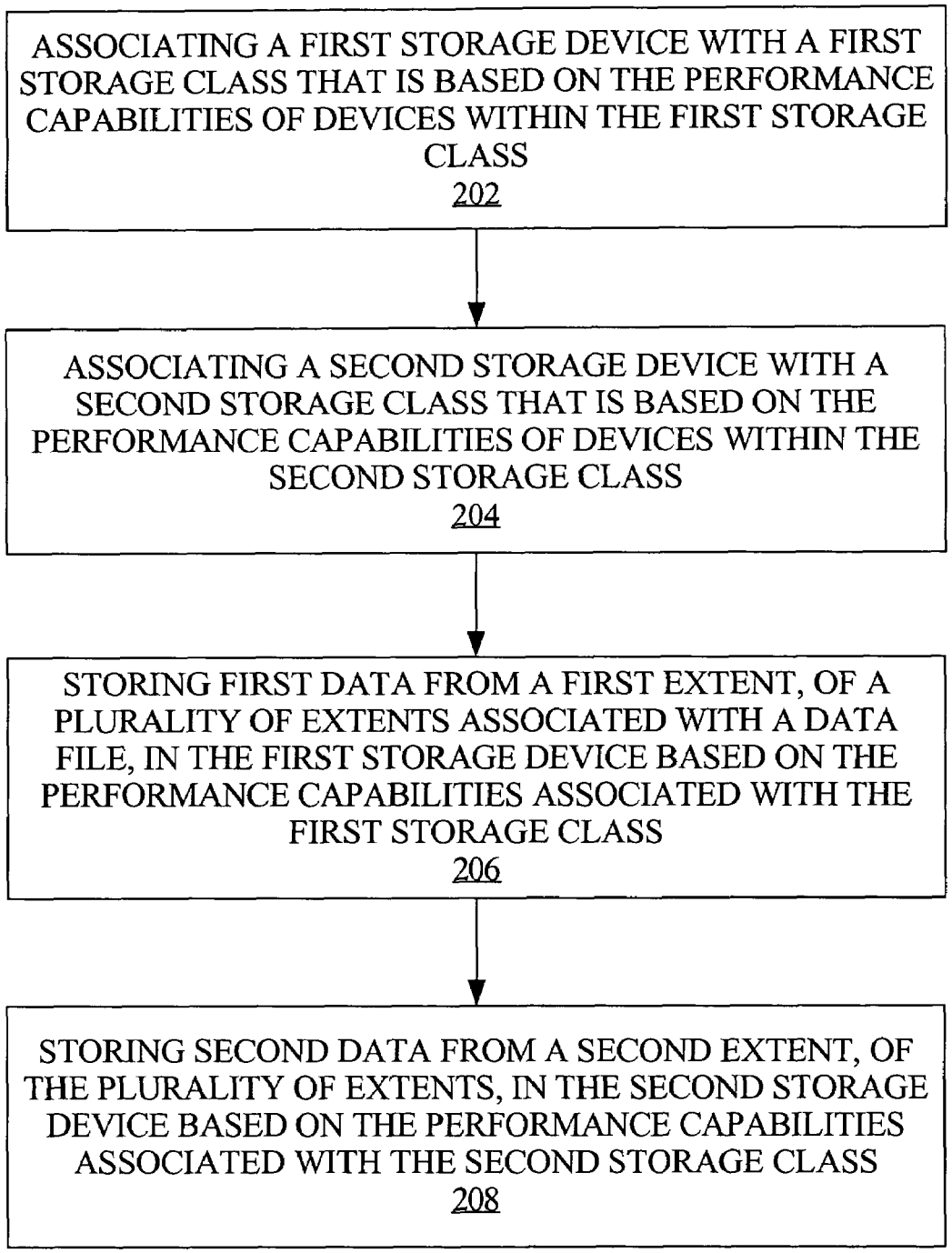
FIG. 2 is a flow diagram that illustrates a method for storing data on a storage system comprising storage devices with different performance capabilities, according to an embodiment of the invention.

FIG. 2 is a flow diagram that illustrates a method for storing data on a storage system comprising storage devices with different performance capabilities, according to an embodiment of the invention. The method illustrated in FIG. 2 may be performed by executing one or more sequences of instructions by one or more processors in one or more electronic computing devices, for non-limiting examples, a computer system like computer system 400 of FIG. 4.

At block 202, a first storage device is associated with a first storage class that is based on the performance capabilities of storage devices within the first storage class. At block 204, a second storage device is associated with a second storage class that is based on the performance capabilities of storage devices within the second storage class. In relation to blocks 202 and 204, the first and second storage classes are based on the respective performance capabilities of the first and second storage devices. For example, storage device 1 of storage system 104 (FIG. 1) comprises relatively fast disks and, therefore, is associated with storage class 1; and storage device 2 of storage system 104 comprises relatively slow disks and, therefore, is associated with storage class 2.

At block 206, first data from a first extent associated with a data container (e.g., a file) is stored in the first storage device based on the performance capabilities associated with the first storage class. At block 208, second data from a second extent associated with the data container is stored in the second storage device based on the performance capabilities associated with the second storage class. In relation to blocks 206 and 208, storing the first and second data is based on the respective storage classes with which the first and second storage devices are associated. For example, extent 2 of file 106 (FIG. 1) may contain infrequently accessed data and, therefore, this data is stored in storage device 2 based on storage device 2 being associated with storage class 2 and based on storage class 2 being associated with relatively slow disks. Similarly, extent 3 of file 106 may contain frequently accessed data and, therefore, this data is stored in storage device 1 based on storage device 1 being associated with storage class 1 and based on storage class 1 being associated with relatively fast disks.

Automatic Migration

In one embodiment, third data from a third file extent is automatically migrated from the first storage device to the second storage device, while keeping the data from the first extent stored on the first storage device. Migration of the third data is based on the respective storage classes to which the first and second storage devices are associated. For example, historical monitoring of the I/O operations performed involving the third data from the third file extent may show that the third data has been infrequently accessed. Therefore, the third data is migrated from the first storage device, a relatively fast device associated with storage class 1, to the second storage device, a relatively slow device associated with storage class 2.

Such a migration policy may be user-defined, for example, in migration policies 116 (FIG. 1) registered with data storage manager 102 (FIG. 1) according to conventional processes. Migration policies 116 may specify migration thresholds associated with, for example, the frequency of I/O operations involving particular data or extents over a period of time, or with the duration of a period of time over which no I/O operations are performed that involve the particular data or extents, or with other access-based thresholds.

Automatic Promotion

In one embodiment, a third storage device is added to the storage system and associated with a storage class. For example, a new, fast set of disks is added to storage system 104 (FIG. 1) and associated with a new storage class that characterizes the advanced performance capabilities of the disks. Based on third data from a third file extent being heavily accessed, the third data is automatically migrated from the first storage device to the third storage device while keeping the data from the first extent stored on the first storage device. For example, historical monitoring of the I/O operations performed involving the third data may show that the third data has been heavily accessed. Therefore, the third data is automatically migrated, or "promoted," from the first storage device to the faster, better performing device associated with the new storage class. As with migration, a promotion policy may be user-defined, for example, in migration policies 116 (FIG. 1) registered with data storage manager 102 (FIG. 1).

Determine Frequency of Access

Extent Access Bitmap

In one embodiment, each extent in a file has a corresponding "access bit," which is used to indicate whether an extent has been accessed (i.e., a read operation or write operation performed on a block of the extent) since a last previous cycle of saving the access bit. When the process that has opened the file issues an I/O to a block in a file, it must look up the extent map to locate the address of the block on disk. An additional step is to test if the access bit has been set for this extent. The bit is set if it has not already been set. In one embodiment, the additional lookup and, possibly, modification of the access bit is utilized even when the file system does not have disks with different storage classes. For example, the extent access history is recorded to allow an administrator to add lower cost disks to the file system at a later time and to relocate infrequently accessed extents. An I/O access bitmap for a file, such as access bitmap 109 (FIG. 1) is constructed from the access bits for the respective file extents.

Statistics Repository

The I/O access bitmap 109 for a file is stored in a statistics repository 108 (FIG. 1). The statistics repository may vary from implementation to implementation. Conceptually, the statistics repository 108 is stored as an internal file. The access bitmap 109 is periodically appended to the statistics repository 108. For example, a background process or task may execute once every day at midnight (i.e., during periods of low activity), to construct and to store the access bitmap for a file. The I/O access bits for a file's extents are cleared after each reading and storing cycle.

Cached Blocks Extent Bitmap

In one embodiment, in addition to the I/O access bitmap, a set of extents that contain blocks that have been cached is tracked (i.e., a "cached blocks extent bitmap" 115 of FIG. 1). For example, in the context of a database, the set of extents that contain blocks that were cached in a buffer cache 114 (FIG. 1) are tracked. The cached extents are tracked because these extents will not have I/O accesses during the access bit reading and storing cycles, yet they are heavily accessed through the cache. Hence, these extents should not be migrated to lower class storage.

In one embodiment, a "migration bitmap" is constructed from the access bitmap in conjunction with the cached extent bitmap. For example, the set of extents whose I/O access bits are not set in the I/O access bitmap is represented by $\{U\}$, and the set of extents which have blocks that have been cached is represented by $\{C\}$. Therefore, the set of extents that were not accessed during the cycle is $\{U\}-\{C\}$, which is represented in the migration bitmap.

Standard bitmap compression techniques can be used to reduce the size of the bitmaps. However, even with smaller compressed bitmaps, it may not be advisable to store so much data in each cycle. One possible approach is to process in a round-robin manner among the large files (i.e., files larger than a certain threshold size) and to record the access bitmap of a subset of the files during each bit reading and saving cycle.

It is non-trivial to compute the set $\{C\}$ with large caches. For example, a 32 GB cache could have 8 million distinct blocks. There are two possible approaches for constructing the cached blocks extent bitmap 115, which represents the set $\{C\}$, as follows.

In one embodiment, the cached blocks extent bitmap 115 is constructed over several bit reading and saving cycles. Typically, the single logical list of buffers in the buffer cache is represented internally as multiple physical lists. For example, the buffers may be chained in different hash buckets. During a single cycle a subset of the physical lists (rather than the entire buffer cache) is traversed. For example, only a portion of the hash buckets are traversed during a given cycle, and the cached blocks extent bitmaps are merged during every subsequent pass.

In one embodiment, the client processes that have opened the file modify the I/O access bitmap, to reflect the extents containing blocks that are cached. With this approach, access information regarding only a single set $\{U\}$ of un-accessed extents is maintained, and this set is updated in place to reflect the extents that have cached blocks. In a related embodiment, a bit is set in the I/O access bitmap for the corresponding extent whenever a cached block is used. Because access to cached blocks is performed often and in a time-critical manner, the bit could be set in the I/O access bitmap only once for every N accesses to the cache from all processes, to minimize the processing overhead. Thus, this approach implements a trade-off between accuracy of the I/O access bitmap and the run-time overhead.

As mentioned, in some systems the file extent map may be cached. In such systems, the extent map is returned in response to a file open command, or on demand. When the extent map is cached, the algorithm that tracks the extent I/O access bitmap 109 $\{U\}$ and the cached blocks extent bitmap 115 $\{C\}$ executes in the one or more processes that have cached the extent map. The statistics repository 108 may either be maintained by the processes caching the extent map or by the data storage manager 102. In the latter case, the data storage manager 102 retrieves the bitmaps from the client processes. Furthermore, when an extent is relocated a standard inter-process communication procedure is used to invalidate the cached copy of the relocated extents.

Figure 3:
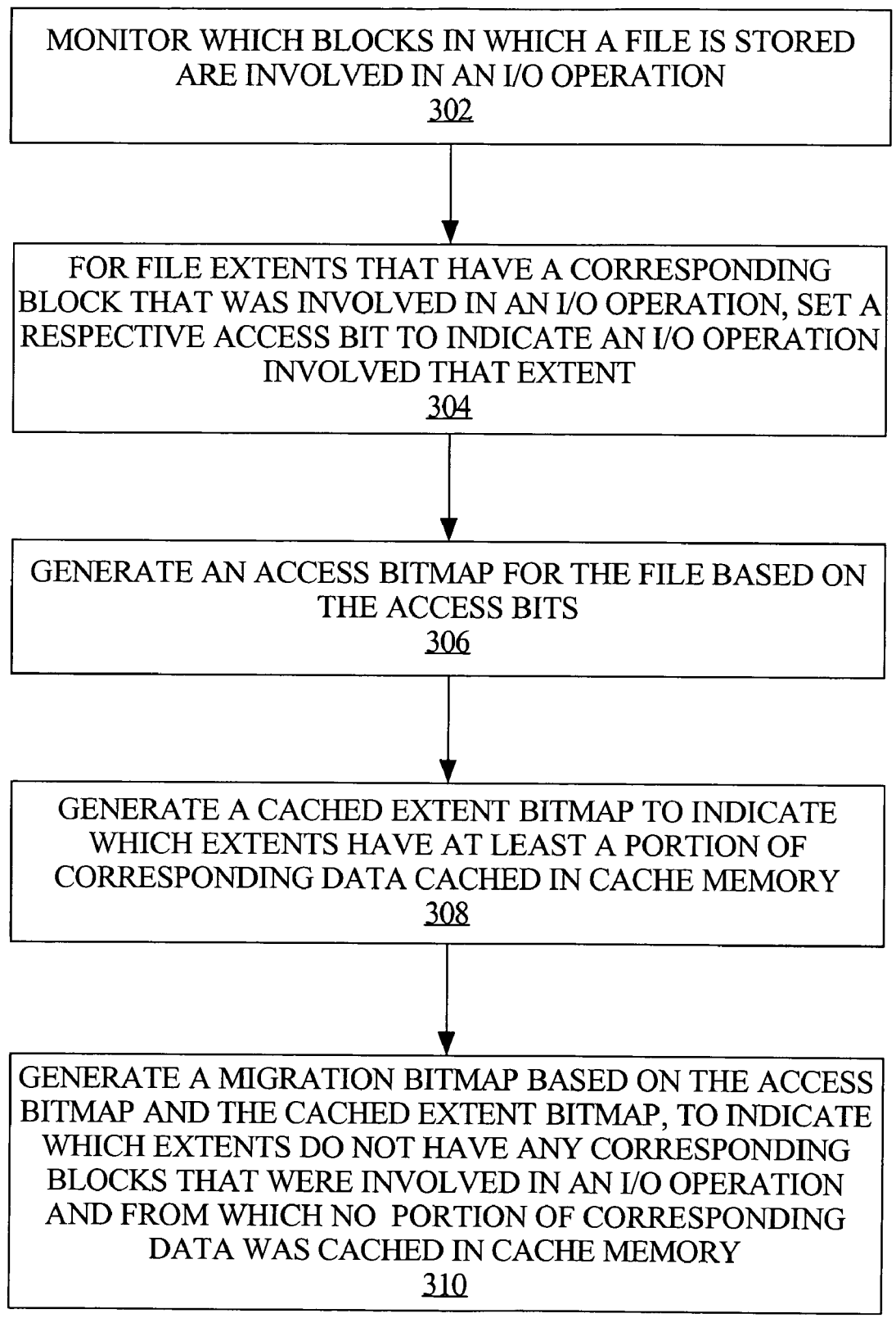
FIG. 3 is a flow diagram that illustrates a method for determining infrequently accessed data blocks associated with file extents, according to an embodiment of the invention.

A Method for Determining Infrequently Accessed Data Blocks Associated with File Extents FIG. 3 is a flow diagram that illustrates a method for determining infrequently accessed data blocks associated with file extents, according to an embodiment of the invention. The method illustrated in FIG. 3 may be performed by executing one or more sequences of instructions by one or more processors in one or more electronic computing devices, for non-limiting examples, a computer system like computer system 400 of FIG. 4.

At block 302, for a file, which corresponding blocks (e.g., persistent memory blocks) are involved in an I/O operation is monitored. At block 304, for file extents that have a corresponding block that was involved in an I/O operation, a respective bit (e.g., an "access bit") is set to indicate that an I/O operation involved that extent. That is, a process sets a bit that is associated with a file extent when a block associated with that extent is the subject of a read or write operation.

At block 306, an access bitmap (e.g., access bitmap 109 of FIG. 1) is generated for the file, based on the access bits for extents that are associated with the file. The access bitmap compactly represents, for the entire file, which corresponding extents have been accessed during the cycle. At block 308, a "cached blocks extent bitmap" (e.g., cached blocks extent bitmap 115 of FIG. 1) is generated to indicate which of the file extents have at least a portion of corresponding data, e.g., a corresponding block of data, cached in cache memory. As with the foregoing example in the context of a database management system, the extents associated with blocks that are cached in buffer cache are identified, such as by a client process. These extents with corresponding cached blocks are then represented in a bitmap format.

At block 310, a "migration bitmap" is generated based on the access bitmap and on the cached blocks extent bitmap. The migration bitmap indicates which file extents do not have any corresponding blocks that were involved in an I/O operation over a period of time (e.g., one or more access bit reading and saving cycles) and from which no portion of corresponding data was cached in cache memory. Hence, an accurate representation of file extents containing infrequently used data is generated, in the form of the migration bitmap. The migration bitmap can then be used in conjunction with migration policies to migrate, or demote, infrequently used data in the file and/or to promote frequently used data in the file, such as to new faster storage.

Impact of Storage Classes on File Extent Allocation

A user may explicitly specify a storage class for a file if the user knows the file's usage a-priori. These files are said to be "bound" to a storage class. When an extent is to be allocated during file creation or when resizing an existing file, it is first determined whether or not the file is bound to a storage class. If the file is bound to a storage class, then a storage device that belongs to the storage class is selected. For example, if the file is bound to storage class 2, then storage device 2 of storage system 104 (FIG. 1) is selected. If the file is not bound to a storage class, then a storage device in the best storage class is selected. If no space is available in the best storage class, then a storage device is selected from another storage class.

When a new storage device is added to storage system 104, extents of files that were not bound to a storage class and that currently have extents allocated on disks in a slower storage class may need to be relocated or promoted. Such a situation may arise, for example, because of a lack of space in the faster storage class during the time the extent was allocated, or because the administrator has added a newer generation storage device which are faster. Using the access bitmaps 109 in the statistics repository 108, the set of extents that are being accessed frequently but are not stored in the best storage class is readily identifiable. These extents are relocated to the newly added storage device that belongs to a better storage class. In one embodiment, extents that were migrated to a slower storage class because they were infrequently accessed are not considered for promotion to the newer, faster storage device.

In one embodiment, the file header is used to track the storage class in which the file's extents should be allocated. If the file is not bound to a storage class, a list of extents that have been migrated to other storage classes and a separate list of extents allocated in slower storage classes due to lack of space can be maintained in the file header.

Hardware Overview

Figure 4:
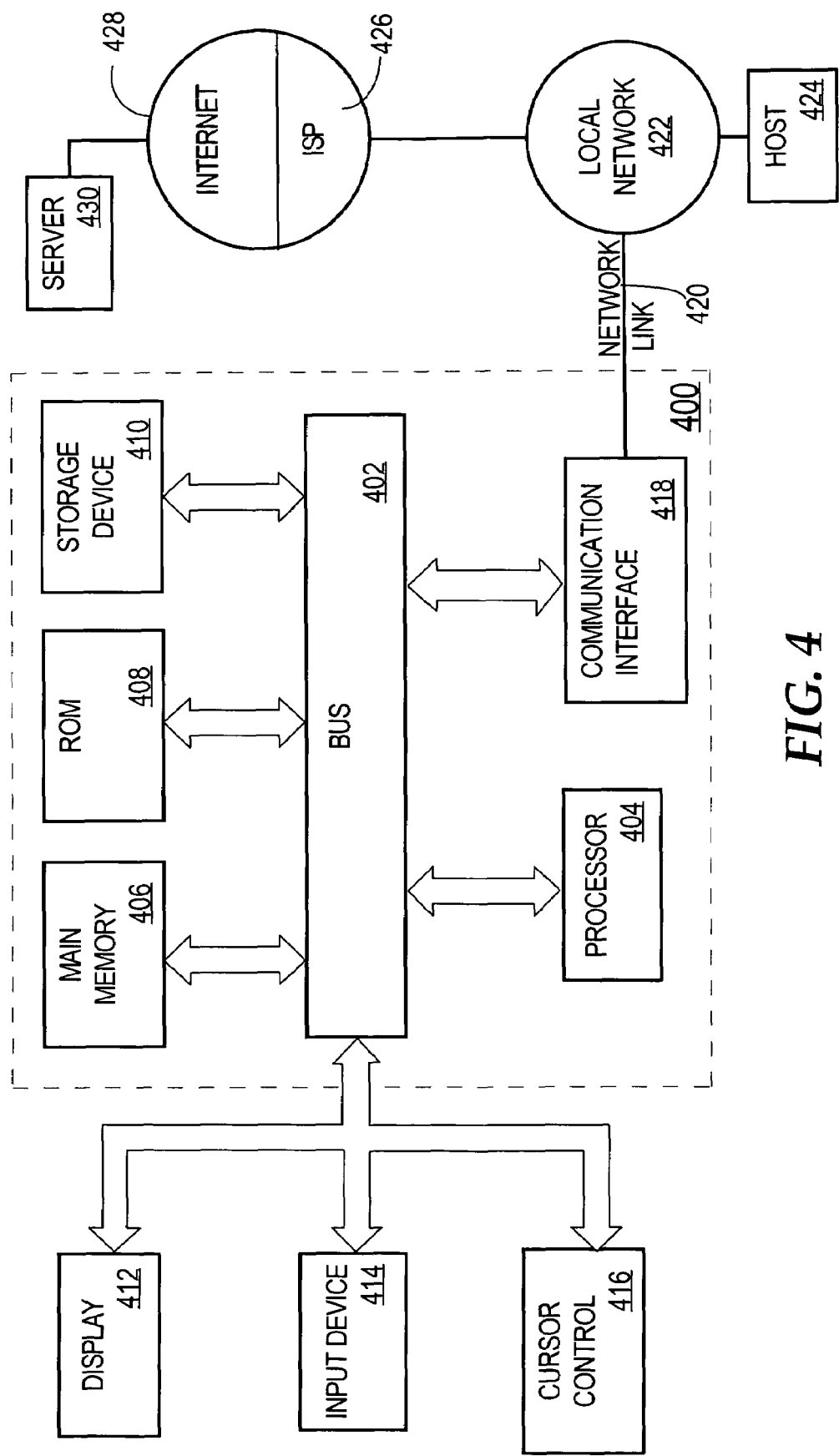
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    monitoring which persistent memory blocks, in which a single data file is stored, are involved in one or more I/O operations, wherein the single data file comprises a plurality of extents that are distinct portions;
    for extents, of the plurality of extents, that have a corresponding persistent memory block that was involved in an I/O operation, setting a respective access bit to indicate an I/O operation involved that extent;
    storing first data from a first extent, of the plurality of extents that are distinct portions of a single data file, in a first persistent storage device;
    storing second data from a second extent, of the plurality of extents, in a second persistent storage device; and
    generating an access bitmap for the file based on the access bits,
    wherein the decision of where to store the first and second data is made automatically based, at least in part, on the access bit map.

2. The computer-implemented method of claim 1, further comprising:
    associating the first persistent storage device within a storage system with a first storage class by storing data that indicates that the first persistent storage device belongs to the first storage class;
    associating the second persistent storage device within the storage system with a second storage class by storing data that indicates that the second persistent storage device belongs to the second storage class;
    monitoring which persistent memory blocks in which the file is stored are involved in one or more I/O operations;
    for extents, of the plurality of extents, that have a corresponding persistent memory block that was involved in an I/O operation, setting a respective access bit to indicate an I/O operation involved that extent; and
    maintaining a file extent map that indicates primary storage locations for the plurality of extents of said single data file,
    wherein the first and second storage classes are based on the respective performance capabilities of at least the first and second persistent storage devices, and wherein the first persistent storage device has different performance capabilities than the second persistent storage device;
    wherein the decision of where to store the first and second data is made automatically based, at least in part, on the respective storage classes with which the first and second persistent storage devices are associated;
    wherein said file extent map indicates that the first persistent storage device serves as primary storage for the first data and said file extent map indicates that the second persistent storage device serves as primary storage for the second data.

3. A computer-implemented method comprising:
    associating a first persistent storage device within a storage system with a first storage class by storing data that indicates that the first persistent storage device belongs to the first storage class;
    associating a second persistent storage device within the storage system with a second storage class by storing data that indicates that the second persistent storage device belongs to the second storage class;
    wherein the first and second storage classes are based on the respective performance capabilities of at least the first and second persistent storage devices, and wherein the first persistent storage device has different performance capabilities than the second persistent storage device; and
    storing first data from a first extent, of a plurality of extents that are distinct portions of a single data file, in the first persistent storage device;

storing second data from a second extent, of the plurality of extents, in the second persistent storage device; and maintaining a file extent map that indicates primary storage locations for the plurality of extents of said single data file, wherein the decision of where to store the first and second data is made automatically based, at least in part, on the respective storage classes with which the first and second persistent storage devices are associated, and wherein said file extent map indicates that the first persistent storage device serves as primary storage for the first data and said file extent map indicates that the second persistent storage device serves as primary storage for the second data;

monitoring which persistent memory blocks in which the file is stored are involved in one or more I/O operations;

for extents, of the plurality of extents, that have a corresponding persistent memory block that was involved in an I/O operation, setting a respective access bit to indicate an I/O operation involved that extent;

generating an access bitmap for the file based on the access bits;

generating a cached extent bitmap to indicate which extents, of the plurality of extents, have at least a portion of corresponding data cached in cache memory; and generating a migration bitmap based on the access bitmap and the cached extent bitmap, to indicate which extents do not have any corresponding persistent memory blocks that were involved in an I/O operation and from which no portion of corresponding data was cached in cache memory.

4. The method of claim 3, further comprising:

automatically migrating, from the first persistent storage device to the second persistent storage device, third data from a third extent of the plurality of extents, while keeping the first extent stored on the first persistent storage device;

wherein the decision to migrate the third data is made automatically based, at least in part, on the respective storage classes to which the first and second persistent storage devices are associated and on the migration bitmap.

5. A machine-readable storage medium storing one or more sequences of instructions which, when executed by one or more processors, causes the one or more processors to carry out the steps of:

associating a first persistent storage device within a storage system with a first storage class by storing data that indicates that the first persistent storage device belongs to the first storage class;

associating a second persistent storage device within the storage system with a second storage class by storing data that indicates that the second persistent storage device belongs to the second storage class;

wherein the first and second storage classes are based on the respective performance capabilities of at least the first and second persistent storage devices, and wherein the first persistent storage device has different performance capabilities than the second persistent storage device; and storing first data from a first extent, of a plurality of extents that are distinct portions of a single data file, in the first persistent storage device;

storing second data from a second extent, of the plurality of extents, in the second persistent storage device; and maintaining a file extent map that indicates primary storage locations for the plurality of extents of said single data file, wherein the decision of where to store the first and second data is made automatically based, at least in part, on the respective storage classes with which the first and second persistent storage devices are associated, and wherein said file extent map indicates that the first persistent storage device serves as primary storage for the first data and said file extent map indicates that the second persistent storage device serves as primary storage for the second data;

monitoring which persistent memory blocks in which the file is stored are involved in one or more I/O operations;

for extents, of the plurality of extents, that have a corresponding persistent memory block that was involved in an I/O operation, setting a respective access bit to indicate an I/O operation involved that extent; and generating an access bitmap for the file based on the access bits.

6. A machine-readable storage medium storing one or more sequences of instructions which, when executed by one or more processors, causes the one or more processors to carry out the steps of:

associating a first persistent storage device within a storage system with a first storage class by storing data that indicates that the first persistent storage device belongs to the first storage class;

associating a second persistent storage device within the storage system with a second storage class by storing data that indicates that the second persistent storage device belongs to the second storage class;

wherein the first and second storage classes are based on the respective performance capabilities of at least the first and second persistent storage devices, and wherein the first persistent storage device has different performance capabilities than the second persistent storage device; and storing first data from a first extent, of a plurality of extents that are distinct portions of a single data file, in the first persistent storage device;

storing second data from a second extent, of the plurality of extents, in the second persistent storage device; and maintaining a file extent map that indicates primary storage locations for the plurality of extents of said single data file, wherein the decision of where to store the first and second data is made automatically based, at least in part, on the respective storage classes with which the first and second persistent storage devices are associated, and wherein said file extent map indicates that the first persistent storage device serves as primary storage for the first data and said file extent map indicates that the second persistent storage device serves as primary storage for the second data;

monitoring which persistent memory blocks in which the file is stored are involved in one or more I/O operations;

for extents, of the plurality of extents, that have a corresponding persistent memory block that was involved in an I/O operation, setting a respective access bit to indicate an I/O operation involved that extent;

generating an access bitmap for the file based on the access bits;

generating a cached extent bitmap to indicate which extents, of the plurality of extents, have at least a portion of corresponding data cached in cache memory; and generating a migration bitmap based on the access bitmap and the cached extent bitmap, to indicate which extents do not have any corresponding persistent memory blocks that were involved in an I/O operation and from which no portion of corresponding data was cached in cache memory.

7. The machine-readable storage medium of claim 6 further comprising instructions which, when executed by one or more processors, causes the one or more processors to carry out the step of:

automatically migrating, from the first persistent storage device to the second persistent storage device, third data from a third extent of the plurality of extents, while keeping the first extent stored on the first persistent storage device;

wherein the decision to migrate the third data is made automatically based, at least in part, on the respective storage classes to which the first and second persistent storage devices are associated and on the migration bitmap.

8. A computer-implemented method comprising:

monitoring, for a period of time, which persistent memory blocks in which a data container is stored are involved in an I/O operation;

for extents, of a plurality of extents associated with the container, that have a corresponding persistent memory block that was involved in an I/O operation during the period of time, setting a respective access bit to indicate an I/O operation involved that extent;

generating a first bitmap for the container based on the access bits, to indicate which extents of the plurality of extents were accessed during the period of time;

generating a second bitmap to indicate which extents, of the plurality of extents, have at least a portion of corresponding data cached in cache memory; and generating a third bitmap based on the first and second bitmaps, to indicate which extents do not have any corresponding persistent memory blocks that were involved in an I/O operation and from which no portion of corresponding data was cached in cache memory.

9. A machine-readable storage medium storing one or more sequences of instructions which, when executed by one or more processors, causes the one or more processors to carry out the steps of:

monitoring, for a period of time, which persistent memory blocks in which a data container is stored are involved in an I/O operation;

for extents, of a plurality of extents associated with the container, that have a corresponding persistent memory block that was involved in an I/O operation during the period of time, setting a respective access bit to indicate an I/O operation involved that extent;

generating a first bitmap for the container based on the access bits, to indicate which extents of the plurality of extents were accessed during the period of time;

generating a second bitmap to indicate which extents, of the plurality of extents, have at least a portion of corresponding data cached in cache memory; and generating a third bitmap based on the first and second bitmaps, to indicate which extents do not have any corresponding persistent memory blocks that were involved in an I/O operation and from which no portion of corresponding data was cached in cache memory.

10. A machine-readable storage medium storing one or more sequences of instructions which, when executed by one or more processors, causes the one or more processors to monitoring which persistent memory blocks, in which a single data file is stored, are involved in one or more I/O operations, wherein the single data file comprises a plurality of extents that are distinct portions;

for extents, of the plurality of extents, that have a corresponding persistent memory block that was involved in an I/O operation, setting a respective access bit to indicate an I/O operation involved that extent;

storing first data from a first extent, of the plurality of extents that are distinct portions of a single data file, in a first persistent storage device;

storing second data from a second extent, of the plurality of extents, in a second persistent storage device; and generating an access bitmap for the file based on the access bits, wherein the decision of where to store the first and second data is made automatically based, at least in part, on the access bit map.

11. The machine-readable storage medium of claim 10, further comprising one or more sequences of instructions which, when executed by one or more processors, causes the one or more processors to carry out the steps of:

associating the first persistent storage device within a storage system with a first storage class by storing data that indicates that the first persistent storage device belongs to the first storage class;

associating the second persistent storage device within the storage system with a second storage class by storing data that indicates that the second persistent storage device belongs to the second storage class;

monitoring which persistent memory blocks in which the file is stored are involved in one or more I/O operations;

for extents, of the plurality of extents, that have a corresponding persistent memory block that was involved in an I/O operation, setting a respective access bit to indicate an I/O operation involved that extent; and maintaining a file extent map that indicates primary storage locations for the plurality of extents of said single data file, wherein the first and second storage classes are based on the respective performance capabilities of at least the first and second persistent storage devices, and wherein the first persistent storage device has different performance capabilities than the second persistent storage device;

wherein the decision of where to store the first and second data is made automatically based, at least in part, on the respective storage classes with which the first and second persistent storage devices are associated;

wherein said file extent map indicates that the first persistent storage device serves as primary storage for the first data and said file extent map indicates that the second persistent storage device serves as primary storage for the second data.

12. A computer-implemented method comprising:

associating a first persistent storage device within a storage system with a first storage class by storing data that indicates that the first persistent storage device belongs to the first storage class;

associating a second persistent storage device within the storage system with a second storage class by storing data that indicates that the second persistent storage device belongs to the second storage class;

wherein the first and second storage classes are based on the respective performance capabilities of at least the first and second persistent storage devices, and wherein the first persistent storage device has different performance capabilities than the second persistent storage device; and storing first data from a first extent, of a plurality of extents that are distinct portions of a single data file, in the first persistent storage device;

storing second data from a second extent, of the plurality of extents, in the second persistent storage device; and maintaining a file extent map that indicates primary storage locations for the plurality of extents of said single data file, wherein the decision of where to store the first and second data is made automatically based, at least in part, on the respective storage classes with which the first and second persistent storage devices are associated, and wherein said file extent map indicates that the first persistent storage device serves as primary storage for the first data and said file extent map indicates that the second persistent storage device serves as primary storage for the second data;

monitoring which persistent memory blocks in which the file is stored are involved in one or more I/O operations;

for extents, of the plurality of extents, that have a corresponding persistent memory block that was involved in an I/O operation, setting a respective access bit to indicate an I/O operation involved that extent; and generating an access bitmap for the file based on the access bits.

\* \* \* \* \*

UNITED STATES PATENT AND TRADEMARK OFFICE
CERTIFICATE OF CORRECTION

| | | |
|---|---|---|
| PATENT NO. | : 7,711,916 B2 | Page 1 of 1 |
| APPLICATION NO. | : 11/127699 | |
| DATED | : May 4, 2010 | |
| INVENTOR(S) | : Sashikanth Chandrasekaran et al. | |

It is certified that error appears in the above-identified patent and that said Letters Patent is hereby corrected as shown below:

Title Page;
On the face page, in field (54), in column 1, in "Title", line 3, delete "WITH" and insert -- WITHIN --, therefor.

On page 2, in column 1, under "Other Publications", line 17, delete ".html>" and insert -- .html>, --, therefor.

In column 1, line 3, delete "WITH" and insert -- WITHIN --, therefor.

In column 14, line 14, in claim 1, delete "bit map." and insert -- bitmap. --, therefor.

In column 18, line 18, in claim 10, delete "bit map" and insert -- bitmap. --, therefor.

Signed and Sealed this
Second Day of August, 2011

David J. Kappos
*Director of the United States Patent and Trademark Office*